(12) United States Patent
Chang et al.

(10) Patent No.: US 10,649,129 B2
(45) Date of Patent: May 12, 2020

(54) LIGHT GUIDE PLATE, BACKLIGHT MODULE AND DISPLAY DEVICE

(71) Applicant: Shenzhen China Star Optoelectronics Technology Co., Ltd., Shenzhen, Guangdong (CN)

(72) Inventors: Jianyu Chang, Guangdong (CN); Yung-jui Lee, Guangdong (CN); Yu-chun Hsiao, Guangdong (CN); Sheng-Jer Chang Chien, Guangdong (CN); Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/556,082

(22) PCT Filed: Jul. 18, 2017

(86) PCT No.: PCT/CN2017/093255
§ 371 (c)(1),
(2) Date: Sep. 6, 2017

(87) PCT Pub. No.: WO2018/209785
PCT Pub. Date: Nov. 22, 2018

(65) Prior Publication Data
US 2018/0335560 A1    Nov. 22, 2018

(30) Foreign Application Priority Data

May 16, 2017  (CN) .......................... 2017 1 0344094

(51) Int. Cl.
*G02B 6/00* (2006.01)
*F21V 8/00* (2006.01)

(52) U.S. Cl.
CPC ......... *G02B 6/0043* (2013.01); *G02B 6/0003* (2013.01); *G02B 6/005* (2013.01); *G02B 6/0065* (2013.01)

(58) Field of Classification Search
CPC ......... G02F 1/133524; G02F 1/133615; G02B 6/0043; G02B 6/0023; G02B 6/0003; G02B 6/0035; G02B 6/00351
See application file for complete search history.

(56) References Cited

U.S. PATENT DOCUMENTS 9,139,767 B2     9/2015  Dubrow
9,199,842 B2 *  12/2015  Dubrow ................. B82Y 20/00
(Continued)

FOREIGN PATENT DOCUMENTS

CN         103148406 A     6/2013
CN         103487857 A     1/2014
(Continued)

*Primary Examiner* — Anabel Ton
(74) *Attorney, Agent, or Firm* — Andrew C. Cheng

(57) ABSTRACT

The present invention discloses a light guide plate, a backlight module and a display device. The light guide plate comprises a light conversion layer, the light conversion layer is arranged at a light emitting plane of the light guide plate for receiving a first light and converting the same to at least a second light to emit. According to the aforesaid aspect, the present invention can improve the display effect of the display device by making the emitted light have a better diffusivity and a larger brightness view angle.

12 Claims, 2 Drawing Sheets

(56) References Cited

U.S. PATENT DOCUMENTS

| | | | | |
|---|---|---|---|---|
| 2010/0002414 A1* | 1/2010 | Meir | ................. | G02B 6/0021 |
| | | | | 362/84 |
| 2015/0086169 A1* | 3/2015 | Breen | ................. | C09K 11/025 |
| | | | | 385/131 |
| 2015/0226905 A1 | 8/2015 | Yoon et al. | | |
| 2015/0323728 A1 | 11/2015 | Lee et al. | | |
| 2016/0091649 A1* | 3/2016 | Uchiumi | ................. | G02B 6/005 |
| | | | | 349/61 |
| 2016/0170127 A1 | 6/2016 | Kim et al. | | |
| 2017/0022412 A1* | 1/2017 | Qiu | ................. | C09K 11/025 |
| 2017/0022628 A1* | 1/2017 | Breen | ................. | C30B 7/14 |
| 2017/0090248 A1* | 3/2017 | Yoneyama | ................. | B32B 7/02 |
| 2017/0168214 A1 | 6/2017 | Cheng | | |
| 2017/0176816 A1* | 6/2017 | Han | ................. | G02B 5/207 |

FOREIGN PATENT DOCUMENTS

| | | |
|---|---|---|
| CN | 103869528 A | 6/2014 |
| CN | 105158841 A | 12/2015 |
| CN | 105353557 A | 2/2016 |
| CN | 105824151 A | 8/2016 |

\* cited by examiner

Mesh points

Mesh points

LIGHT GUIDE PLATE, BACKLIGHT MODULE AND DISPLAY DEVICE

FIELD OF THE INVENTION

The present invention relates to a liquid crystal display field, and more particularly to a light guide plate, a backlight module and a display device.

BACKGROUND OF THE INVENTION

The Liquid Crystal Display (LCD) possesses many advantages of being ultra thin, power saved and radiation free and now has already dominate the flat panel display field. The present liquid crystal displays are widely applied in the electronic products, such as High-definition digital TV, desktop computer, tablet computer, laptop, mobile phone and digital camera.

The liquid crystal display comprises a liquid crystal display panel and a backlight module. The backlight module is applied to provide a light source for the liquid crystal display panel. The backlight module generally comprises a light source and a light guide plate. The light emitted by the LED light source enters the light guide plate and the uniform utilization of the light is realized with the mesh points on a bottom of the light guide plate to provide the light source for the liquid crystal display panel. A certain amount of optical films are arranged on an upper surface of the light guide plate for shielding the mura or increasing the brightness. In the long-term research and development, the inventors of the present application have found that the light emitted by the light source in the existing design can greatly enhance the brightness of the display after the multiple optical films but the view angle is reduced and the color gamut is low, which affects the overall display.

SUMMARY OF THE INVENTION

An objective of the present invention is to provide a light guide plate, a backlight module and a display device, which enables the display device to have a larger view angle for better display.

For solving the aforesaid skill issues, the present invention utilizes a skill solution that a backlight module comprising a light guide plate is provided and the light guide plate comprises a light conversion layer; the light conversion layer is arranged at a light emitting plane of the light guide plate for receiving a first light and converting the same to at least a second light to emit; a thickness of the light conversion layer is in a range of 45 microns to 165 microns; the light conversion layer comprises a quantum dot material and/or a fluorescent material.

For solving the aforesaid skill issues, the present invention utilizes a skill solution that a light guide plate comprising a light conversion layer is provided and the light conversion layer is arranged at a light emitting plane of the light guide plate for receiving a first light and converting the same to at least a second light to emit.

For solving the aforesaid skill issues, the present invention utilizes another skill solution that a display device comprising a backlight module is provided and the backlight module comprises a light guide plate having a light conversion layer and the light conversion layer is arranged at a light emitting plane of the light guide plate for receiving a first light and converting the same to at least a second light to emit.

The benefits of the present invention are: being different from the condition of prior art, the present invention provides a light guide plate. The light guide plate comprises a light conversion layer. The light conversion layer can receive a first light and converting the same to at least a second light to emit, which can make the emitted light have a better diffusivity and a larger brightness view angle for promoting the display effect of the display device.

DETAILED DESCRIPTION OF PREFERRED EMBODIMENTS

For the purpose, technical solutions and advantages of the present invention will become clear, unambiguous, embodiments of the present invention is described in further detail below with reference to the accompanying drawings simultaneously.

Figure 1:
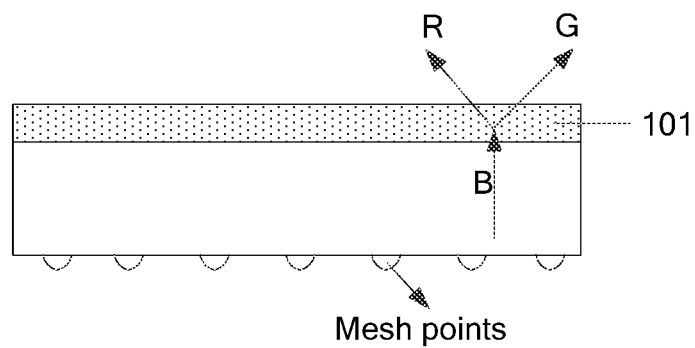
FIG. 1 is a structure diagram of one embodiment of a light guide plate of the present invention.

Please refer to FIG. 1. FIG. 1 is a structure diagram of one embodiment of a light guide plate of the present invention. The present invention provides a light guide plate for a backlight module. The light guide plate comprises a light conversion layer 101 is provided and the light conversion layer 101 is arranged at a light emitting plane of the light guide plate for receiving a first light and converting the same to at least a second light to emit. Optionally, the first light is ultraviolet or blue. The second light is yellow, a green and red mixed light, or a blue, green and red mixed light.

Figure 2:
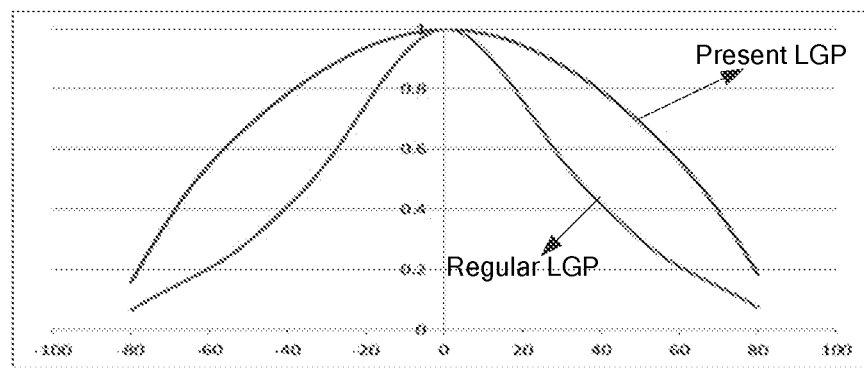
FIG. 2 is a comparison diagram of a brightness view angle of a light guide plate and a brightness view angle of a regular light guide plate.

Please refer to FIG. 2. FIG. 2 is a comparison diagram of a brightness view angle of a light guide plate and a brightness view angle of a regular light guide plate. In fact, the light conversion layer 101 may emit light as a self-emitting light source, which is similar as a lambertian light source in the process that the light conversion layer 101 receives a first light and converts the same to at least a second light to emit. The emitted light has a better diffusivity and a larger brightness view angle for promoting the display effect of the display device. Furthermore, the light conversion layer 101 has a better light dispersion effect and is capable of masking the dot mura caused by the shielding mesh points. When the backlight module uses the light guide plate, the use of other optical film can reduced to simplify the production process and saving the cost.

Optionally, in one embodiment, the light conversion layer 101 comprises a light conversion material and the light conversion material is a photoluminescent material, which enables the emitted light to externally emit light; the light conversion material comprises a quantum dot material and/or a fluorescent material. Quantum Dot (QD) refers to a particle material that three dimensions are all in order of nanometer. The quantum dots can enter the excited state when the light is received and can emit light of a specific wavelength (i.e. a specific color) as returning from the excited state to the ground state. The luminescent spectrum of QD is mainly controlled by the QD particle size. Thus, the luminescent spectrum can be adjusted by changing the QD particle size; meanwhile, the QD conversion efficiency is high to improve the utilization of light. The QD luminescent spectrum half-wave width is very narrow and the temperature stability is good. The use of quantum dots as the light conversion material can greatly improve the color gamut, thereby improving the display effect of the device display.

The quantum dot material can be II-VI family quantum dots, III-V family quantum dots and family quantum dots. Moreover, it can also be mixtures of various quantum dots; wherein II-VI family quantum dot material refers to a compound formed by elements of group II and elements of group VI and the similarity is for the III-V family quantum dots and family quantum dots. Specifically, the quantum dot material can be one or more of $ZnCdSe_2$, CdSe, CdTe, $CuInS_2$ and $ZnCuInS_3$. The size of the quantum dot, the type of material, the type of fluorescent material can be decided according to the actual needs of the deployment.

Optionally, in one embodiment, a concentration ratio of the quantum dot material to the fluorescent material is in a range of 1:100 to 1:1, such as 1:100, 1:70, 1:40, 1:20, 1:5 or 1:1. The light conversion efficiency of quantum dots is higher than that of ordinary fluorescent materials but the price of quantum dots is higher than that of ordinary fluorescent materials. If the whole piece of light conversion film uses the quantum dot material, it will make the preparation cost increase. Besides, once the light conversion efficiency has reached a certain value, the increase in the amount of quantum material only has little influence to the ultimate display effect and results the resource waste. Therefore, in this embodiment, the combination of the quantum dot material and the fluorescent material is selected not only to ensure the light conversion efficiency but also to save the cost.

Optionally, in one embodiment, the light conversion layer 101 comprises a light conversion material and scattering particles. The backlight is generally ultraviolet light or blue light. When the ultraviolet light source is used, the light conversion material needs to comprises a blue light conversion material, a green light conversion material and a red light conversion material, which respectively are blue light quantum dot material, green quantum dot material and red quantum dot material for the quantum dot material as an illustration; the three different quantum dot materials respectively absorb the ultraviolet light and convert the same to blue light, green light and red light. The blue light, the green light and the red light emitted by the light conversion material are all isotropic and have better diffusivity. The brightness view angle can be increased and no color cast problem appears.

When the blue light source is used, the light conversion material only comprises a green light conversion material and a red light conversion material, wherein green light and red light are emitted by the light conversion material absorbing the blue light and are isotropic; however, the blue light directly emits out from the light guide plate with a certain direction. As finally mixing the lights to form white light, the uneven mixture of the light direction will cause the color cast problem. In order to increase the diffusivity of the blue light, the light conversion layer 101 further comprises scattering particles. The scattering particles can increase the diffusivity of the blue light so that the light can be diffuse for effectively solving the color cast problem.

The scattering particles may be any suitable optical material known in the art, such as glass hollow beads and polymer particles. The particle size of the scattering particles is in a range of 0.5 μm to 6.5 μm, such as 0.5 microns, 1.3 microns, 2.7 microns, 4.1 microns, 5.6 microns or 6.5 microns. A material of larger density can be chose for making the scattering particles so that scattered particles will sink below to be closer to the light source. A concentration ratio of the light conversion material to the scattering particles is in a range of 1:1 to 1:15, such as 1:1, 1:3, 1:5, 1:8, 1:12 or 1:15. By deploying the proportion of the light conversion material and the type, proportion and size of the scattering particles, the degree of blue light scattering can be increased to reduce the large view angle color cast problem of the backlight module. Meanwhile, the concentration ratio of the light conversion material to the scattering particles is adjusted to make the backlight module have a lower color temperature.

Optionally, in one embodiment, mesh points are arranged on a bottom surface of the light guide plate, an amount of the scattering particles and/or the quantum dot material and/or the fluorescent material corresponding to the mesh points is larger than an amount thereof not corresponding to the mesh points. By adjusting the density distribution of the scattering particles and/or the light conversion material at different positions, the emitted light can be more uniform and the bright spot can be polished to further enhance the display effect of the display device.

Optionally, in one embodiment, the light conversion layer 101 comprises a light conversion material and a concentration of the light conversion material in the light conversion layer 101 is in a range of 0.01% to 30%. The concentration can be either a mass content or a volumetric content. The deployment can be executed according to the material, the density, the particle size, the type of base material of light conversion material. In other embodiments, the concentration can also be either a mass content or a volumetric content. The concentration of the light conversion material in the light conversion layer 101 can influence the color temperature of the backlight module. With the concentration increase of the light conversion material, the color temperature of the backlight module will be reduced. The color temperature of the backlight module can be reduced to 13000 or less, such as 13000, 10000, 8000 or 6000. Therefore, in order to reduce the color temperature of the backlight module, the concentration of the light conversion material can be appropriately increased, such as 0.01%, 0.05%, 0.5%, 5%, 15%, 20%, 25%, 30% and so on.

Optionally, in one embodiment, a thickness of the light conversion layer 101 is in a range of 45 microns to 165 microns. As the thickness of the light conversion layer 101 increases, the color temperature of the backlight module will also decrease. Therefore, in order to reduce the color temperature of the backlight module, thickness of the light conversion layer 101 can be appropriately increased, such as 45 microns, 75 microns, 110 microns, 130 microns, 150 microns, 165 microns and so on.

Figure 3:
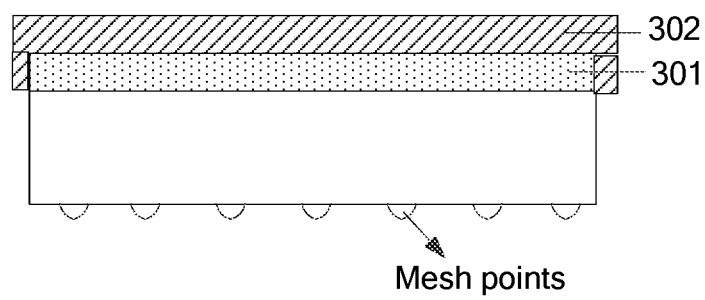
FIG. 3 is a structure diagram of one embodiment of a light guide plate of the present invention.

Please refer to FIG. 3. FIG. 3 is a structure diagram of one embodiment of a light guide plate of the present invention. In this embodiment, the light guide plate further comprises a protective film layer 302 and the protective film layer 302 is adhered a side of the light conversion layer 301 remote from the light guide plate. Since the light conversion material in the light conversion layer 301 is generally more sensitive to water vapor and oxygen and is liable to fail during use, addition of one protective film layer 302 can effectively protect the light conversion layer 301 to extend the service life.

Figure 4:
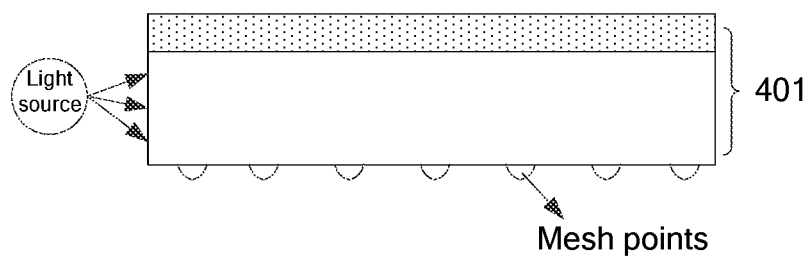
FIG. 4 is a structure diagram of one embodiment of a backlight module of the present invention.

Please refer to FIG. 4. FIG. 4 is a structure diagram of one embodiment of a backlight module of the present invention.

The present invention provides a backlight module. The backlight module comprises a light source and the light guide plate 401 in the aforesaid embodiment. Please refer to the description of the above embodiments and no detail description is repeated here.

The light guide plate 401 in the backlight module comprises a light conversion layer. The conversion layer can make the emitted light have a better diffusivity and a larger brightness view angle. Thus, the backlight module brightness view angle can be greatly improved to reach 120 degrees or more, such as 130 degrees, 140 degrees, 150 degrees, 170 degrees and so on. Meanwhile, the color temperature of the backlight module can be reduced to 13000 or less, such as 13000, 10000, 8000 or 6000, thereby enabling the display device to achieve a wide view angle effect. Furthermore, for better view angle effect, the backlight module may not comprise a prism sheet and a diffusion sheet or may not comprise a diffusion sheet and a prism sheet converging light horizontally to be configured on the light guide plate. Under such circumstance, ⅓ of the brightness view angle of the backlight module can reach 120 degrees or more, even 130 degrees; furthermore, any optical film may not be configured. Under such circumstance, ⅓ of the brightness view angle of the backlight module can reach 140 degrees or more, even 150 degrees to greatly promote the view angle and the watching experience; furthermore, the use of the films can be decreased to reduce the cost.

Figure 5:
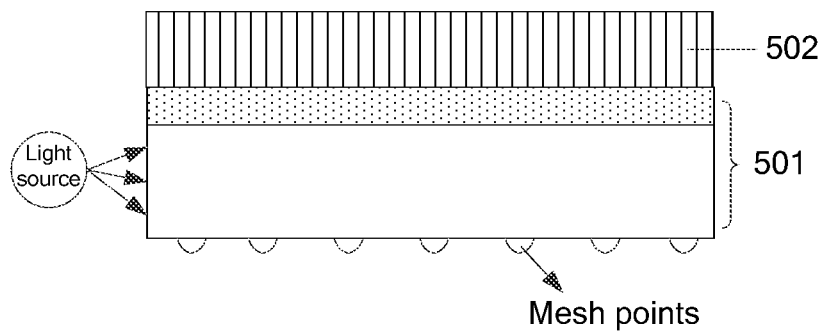
FIG. 5 is a structure diagram of one embodiment of a display device of the present invention.

Please refer to FIG. 5. FIG. 5 is a structure diagram of one embodiment of a display device of the present invention. The present invention provides a display device. The display device comprises a backlight module 501 and a liquid crystal display panel 502. The configuration of the backlight module 501 is the same as that in the foregoing embodiment and no detail description is repeated here; the structure of the liquid crystal display panel 502 is a conventional structure. The backlight module of the display device has a larger light exit angle and then, the display device has a larger view angle and the display effect is better.

In conclusion, the present invention provides a light guide plate. The light guide plate comprises a light conversion layer. The light conversion layer can receive a first light and converting the same to at least a second light to emit, which can make the emitted light have a better diffusivity and a larger brightness view angle for promoting the display effect of the display device.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A backlight module, comprising a light guide plate, wherein the light guide plate comprises a light conversion layer, the light conversion layer is arranged at a light emitting plane of the light guide plate for receiving a first light and converting the same to at least a second light to emit; a thickness of the light conversion layer is in a range of 45 microns to 165 microns; the light conversion layer comprises a light conversion material; wherein the light conversion material comprises a quantum dot material and a fluorescent material, a concentration ratio of the quantum dot material to the fluorescent material is in a range of 1:100 to 1:1;
 a concentration of the light conversion material in the light conversion layer is in a range of 0.01% to 30%.

2. The backlight module according to claim 1, wherein the light conversion layer further comprises scattering particles; a concentration ratio of the light conversion material to the scattering particles is in a range of 1:1 to 1:15.

3. The backlight module according to claim 1, wherein the light guide plate further comprises a protective film layer and the protective film layer is adhered to a side of the light conversion layer remote from the light guide plate.

4. A display device, comprising a backlight module, wherein the backlight module comprises a light guide plate and the light guide plate comprises a light conversion layer, the light conversion layer is arranged at a light emitting plane of the light guide plate for receiving a first light and converting the same to at least a second light to emit;
 the light conversion layer comprises a light conversion material and a concentration of the light conversion material in the light conversion layer is in a range of 0.01% to 30%, the light conversion material comprises a quantum dot material and a fluorescent material, a concentration ratio of the quantum dot material to the fluorescent material is in a range of 1:100 to 1:1.

5. A light guide plate, comprising a light conversion layer, wherein the light conversion layer is arranged at a light emitting plane of the light guide plate for receiving a first light and converting the same to at least a second light to emit;
 the light conversion layer comprises a light conversion material and a concentration of the light conversion material in the light conversion layer is in a range of 0.01% to 30%, the light conversion material comprises a quantum dot material and a fluorescent material, a concentration ratio of the quantum dot material to the fluorescent material is in a range of 1:100 to 1:1.

6. The light guide plate according to claim 5, wherein the light conversion layer comprises a light conversion material and scattering particles; a concentration ratio of the light conversion material to the scattering particles is in a range of 1:1 to 1:15.

7. The light guide plate according to claim 6, wherein mesh points are arranged on a bottom surface of the light guide plate, an amount of at least one of the scattering particles and the light conversion material corresponding to the mesh points is larger than an amount thereof not corresponding to the mesh points.

8. The light guide plate according to claim 5, wherein a thickness of the light conversion layer is in a range of 45 microns to 165 microns.

9. The light guide plate according to claim 5, wherein the light guide plate further comprises a protective film layer and the protective film layer is adhered to a side of the light conversion layer remote from the light guide plate.

10. The display device according to claim 4, wherein the light conversion layer comprises a light conversion material and scattering particles; a concentration ratio of the light conversion material to the scattering particles is in a range of 1:1 to 1:15.

11. The display device according to claim 4, wherein a thickness of the light conversion layer is in a range of 45 microns to 165 microns.

12. The display device according to claim 4, wherein the light guide plate further comprises a protective film layer and the protective film layer is adhered to a side of the light conversion layer remote from the light guide plate.

* * * * *